July 11, 1939.  F. H. KRANZ  2,165,490
GAS ABSORPTION
Filed Dec. 10, 1936
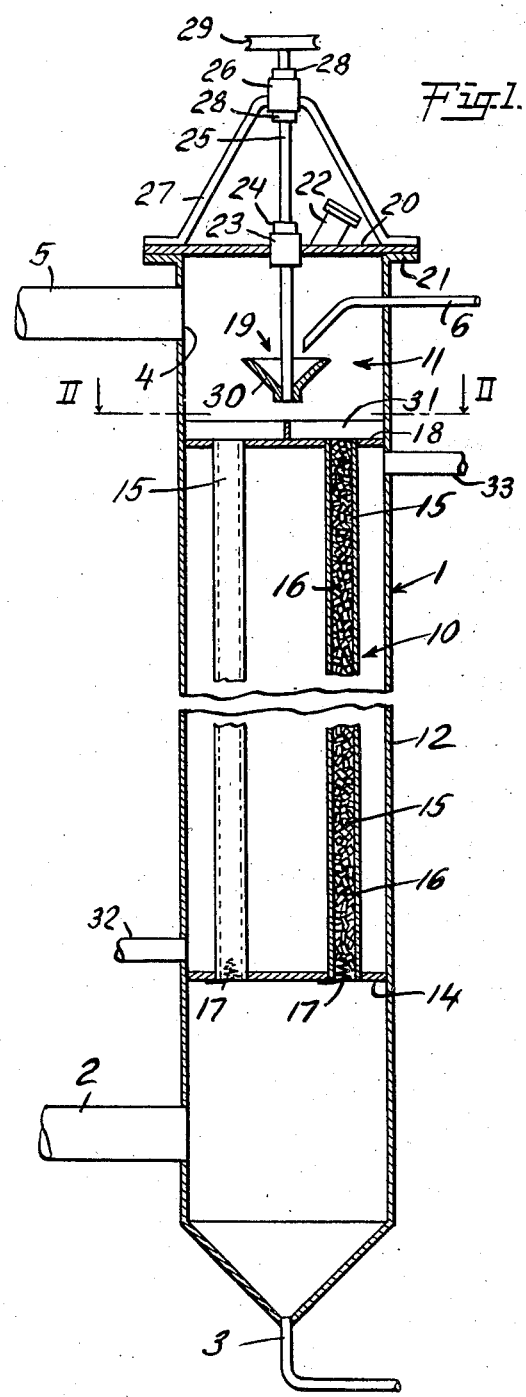
INVENTOR
Frederick H. Kranz
BY
ATTORNEY Patented July 11, 1939

2,165,490

UNITED STATES PATENT OFFICE 2,165,490

GAS ABSORPTION

Frederick H. Kranz, Buffalo, N. Y., assignor to National Aniline & Chemical Company, Inc., New York, N. Y., a corporation of New York Application December 10, 1936, Serial No. 115,162

2 Claims. (Cl. 23—3)

This invention is directed to scrubbing of gases with liquids, e. g., to gas purification processes, and more particularly to the absorption of a gas from a mixture of gases by contacting the gas mixture with a suitable liquid scrubbing medium.

It is an object of this invention to provide a process for effectively scrubbing a gas with a liquid absorbing medium, which process involves high contact efficiency between the gas and liquid scrubbing medium, requires relatively inexpensive equipment for its practice, and is economical to practice. Other objects and advantages will be made evident as the description progresses.

According to the present invention, a unit stream of scrubbing liquid is subdivided into a plurality of spaced separate substantially equal streams, each of relatively small cross-sectional area. A unit stream of gas is likewise subdivided into a plurality of spaced separate streams, each of relatively small cross-sectional area. Each of these gas streams ascends in intimate contact with an individual stream of liquid. Following the intimate contact of the separate streams of gas and liquid, the streams of liquid may be united into a unit stream and the streams of gas which have been scrubbed by contact with the liquid may also be united into a unit stream.

I have found that by subdividing a unit stream of gas into a plurality of separate streams, each of relatively small transverse section, and in each of which the gas is contacted with a stream of absorbing liquid, the contact efficiency is much higher than where the entire stream of gas flows upwardly in a large diameter column in contact with a single stream of liquid. The absorbing liquid, in accordance with this invention, is distributed in substantially equal amounts to form a plurality of substantially like streams which flow downwardly into contact with the various ascending gas streams. As the resistance to flow encountered by the various gas streams is substantially equal, the flow of gas in the various streams of gas is substantially equal. Operating in this manner, channeling of the gas as it flows into contact with the liquid absorbing medium is minimized, if not entirely eliminated.

To secure a large contact surface in each stream, the liquid is flowed downwardly within a tube through packing material such as Raschig rings or the like. Preferably the packed length of each tube should be at least twenty-five times the diameter of the tube. I have found that optimum results are obtained by so confining the flow of individual streams of gas and liquid that the cross-sectional area of each stream does not exceed about seven square inches.

In the accompanying drawing forming a part of the specification and showing for purposes of exemplification a preferred form of this invention, without limiting the claimed invention to such illustrative instance, Fig. 1 is a vertical section through an absorption column adapted for practice of this invention;

Fig. 2 is a transverse section on the line II—II of Fig. 1.

The gas scrubbing column 1 is closed at its lower end, and is equipped with a gas inlet conduit 2 and a liquid drain pipe 3 which may be provided with suitable valves (not shown). The upper end of the column is provided at 4 with a gas outlet conduit 5. Scrubbing liquid is fed to the upper end of the column through a pipe 6.

In general, the column comprises a packed tube section 10 and a liquid distributing section 11, both of which are contained within a large diameter pipe 12. Near the lower end of pipe 12 and above gas inlet conduit 2 is a tube plate 14 secured about its periphery to the pipe. The lower ends of a multitude of spaced tubes 15 are secured within openings of the tube plate 14. The tubes 15 preferably are filled to a height at least 25 times the diameter of the tubes with conventional packing material 16, which suitably may be Raschig rings. The packing material in the tubes is supported by conventional means, as for example, a tapered spiral 17 of wire or a slotted cap attached to the lower end of each tube. Spaced from the upper end of the pipe 12 and below pipes 5 and 6 is a second tube plate 18 which is also secured about its periphery to the pipe. The upper end of each of the tubes 15 is secured in an opening in the plate 18.

To distribute liquid introduced through the pipe 6 which extends into the distributing section 11 of the pipe 12 above the tube plate 18 substantially equally to each of the tubes 15 there is provided a distributing sprayer 19. The upper end of pipe 12 is closed by a cover 20 which is secured to a flange 21 about the end of the pipe. A sight glass 22 is mounted eccentrically in the cover, through which the distributing action within the pipe may be observed. A bearing 23 is centrally located in the cover within the upper end of which packing material is held in place by packing nut 24. Shaft 25 carried by the bearing 23 is supported at its upper end by bearing 26 rigidly supported from the cover 20 by means of arms 27. To retain shaft 25 in proper vertical adjustment, safety collars 28 are provided thereon both above and below the bearing 26. Keyed to the upper end of shaft 25 is a drive pulley 29, driven from any suitable source of power. Secured to the lower end of the shaft is a conical sprayhead 30 forming a cup into which the pipe 6 delivers scrubbing liquid. A multitude of partitions 31 are secured to the upper surface of tube plate 18 dividing it into a multitude of equal segments within each of which is located the upper end of one of the tubes 15. As the sprayhead 30 delivers an equal quantity of liquid in all directions the quantity delivered to each segment and hence to each tube is equal.

Gas introduced into the column through the conduit 2 divides into a plurality of equal streams, each ascending one of the pipes 15 countercurrent to a flow of absorbing liquid introduced through the pipe 6 and delivered by the sprayer 19 in equal portions to each of the segments which drain to form equal streams. Scrubbed gas leaves the column by the conduit 5 while the liquid leaves the column by the pipe 3. The column may be provided with a suitable pump for recirculating the liquid therethrough; the circulating system being equipped with an inlet line for addition of fresh scrubbing liquid from time to time as may be required and also a bleed line or drawoff for withdrawing saturated scrubbing liquid.

Packed tube section of column 10 may also be equipped with a liquid inlet 32 and an outlet 33 for circulating any suitable fluid in heat exchange relation with the tubes 15 so as to maintain them at any desired temperature. Thus, in accordance with this invention, the scrubbing of the gas may be carried out at an optimum temperature for most effective results, and this temperature may be maintained constant by regulating the flow of heating or cooling fluid through inlet 32 and outlet 33.

The following examples are given by way of illustration of the operation of the process of this invention in a column having five tubes, as shown in the drawing, each of which was 16' long and 2" in diameter and was packed with 3/8" Raschig China rings.

*Example I—Gas purification—hydrogen sulfide removal from illuminating gas.* Illuminating gas containing 0.0546 gram of hydrogen sulfide per liter of gas was introduced into the tower through inlet 2. A 4% solution of soda ash was introduced into the column through pipe 6 and by means of the distributing sprayer 19 and partitions 31 divided into equal streams flowing downwardly through the packed tubes 15. Thus the illuminating gas passed in intimate contact with the soda ash solution in packed tubes 15, the scrubbed gas leaving the tower through outlet 5. Samples of the scrubbed gas were tested quantitatively to determine the amount of hydrogen sulfide remaining therein and it was found that the gases contained 0.000133 gram of hydrogen sulfide per liter of gas, i. e., a removal of more than 99.7% of the hydrogen sulfide present in the unscrubbed gas.

*Example II—Gas purification—carbon dioxide removal from a hydrogen, carbon dioxide gas mixture.* A gas containing about 14.3 parts carbon dioxide and 85.7 parts hydrogen was introduced into the column through inlet 2 and fed therethrough at the rate of .7 cubic foot per minute. Scrubbing liquid consisting substantially of a 10% aqueous solution of caustic soda was introduced into the column through inlet pipe 6 at the rate of .63 gallon per minute. The scrubbing liquid was equally distributed by the distributing sprayer 19 and flowed downwardly in equal streams through the packed tubes 15 in contact with the ascending gas streams. The sample of the gas withdrawn through pipe 5 was analyzed and was found to be free of carbon dioxide.

Since certain changes may be made in carrying out the above process without departing from the scope of the invention, it is intended that all matter contained in the above description shall be interpreted as illustrative and not in a limiting sense.

What is claimed is:

1. In a gas purification process involving the scrubbing of gas with liquid, the improvement which comprises introducing a stream of liquid into a gas space, dividing said stream of liquid while in said gas space into a plurality of substantially equal portions, flowing said portions through columns of packing to form a plurality of equally spaced liquid streams of equal and uniform circular cross-sectional area throughout their length and each of a cross-sectional area not exceeding 7 square inches, introducing a stream of gas into a second gas space, dividing said stream of gas into a plurality of spaced streams each of a cross-sectional area not exceeding 7 square inches, each individual to a single liquid stream, and each of a length at least equal to 25 times the diameter of a circle equal in area to the cross-sectional area of the said stream, causing each gas stream to flow over the packing in intimate contact with and countercurrent to the liquid stream individual thereto throughout the entire length of said streams, uniting the gas streams in said first-mentioned gas space, and withdrawing the united gas stream from said first-mentioned gas space.

2. In a combustible gas purification process involving the scrubbing of illuminating gas containing hydrogen sulfide with a solution of soda ash, the improvement which comprises introducing a stream of soda ash into a gas space, dividing said stream of soda ash while in said gas space into a plurality of substantially equal portions, flowing said portions through columns of packing to form a plurality of equally spaced soda ash streams of equal and uniform circular cross-sectional area throughout their length and each of cross-sectional area not exceeding 7 square inches, introducing a stream of illuminating gas into a second gas space, dividing said stream of illuminating gas into a plurality of spaced streams each of cross-sectional area not exceeding 7 square inches, each individual to a single soda ash stream and each of a length at least equal to 25 times the diameter of a circle equal in area to the cross-sectional area of the said illuminating gas stream, causing each illuminating gas stream to flow over the packing in intimate contact with and countercurrent to the soda ash stream individual thereto throughout the entire length of said streams, uniting the illuminating gas streams in said first-mentioned gas space, and withdrawing the united illuminating gas stream from said first-mentioned gas space.

FREDERICK H. KRANZ.